US009071492B2

(12) United States Patent
Tang et al.

(10) Patent No.: US 9,071,492 B2
(45) Date of Patent: Jun. 30, 2015

(54) REDUCED LATENCY CHANNEL-ESTIMATION

(71) Applicant: NXP B.V., Eindhoven (NL)

(72) Inventors: Weihua Tang, Eindhoven (NL); Arie Geert Cornelis Koppelaar, Giessen (NL)

(73) Assignee: NXP, B.V., Eindhoven (NL)

( * ) Notice: Subject to any disclaimer, the term of this patent is extended or adjusted under 35 U.S.C. 154(b) by 13 days.

(21) Appl. No.: 13/860,709

(22) Filed: Apr. 11, 2013

(65) Prior Publication Data

US 2013/0279558 A1  Oct. 24, 2013

(30) Foreign Application Priority Data

Apr. 23, 2012 (EP) .................................... 12165114

(51) Int. Cl.
  *H04K 1/10* (2006.01)
  *H04L 27/26* (2006.01)
  *H04L 1/20* (2006.01)
  *H04L 25/02* (2006.01)
  *H04L 25/03* (2006.01)

(52) U.S. Cl.
  CPC ............ *H04L 27/2649* (2013.01); *H04L 1/208* (2013.01); *H04L 25/022* (2013.01); *H04L 25/0224* (2013.01); *H04L 25/03159* (2013.01); *H04L 25/03292* (2013.01); *H04L 25/03324* (2013.01); *H04L 27/2647* (2013.01)

(58) Field of Classification Search
  None
  See application file for complete search history.

(56) References Cited

U.S. PATENT DOCUMENTS

| 6,442,222 | B1 | 8/2002 | Ghazi-Moghadam et al. |
| 2007/0211810 | A1* | 9/2007 | Bohnke et al. ................ 375/260 |
| 2007/0274407 | A1* | 11/2007 | Thomson et al. ............. 375/260 |
| 2009/0161781 | A1 | 6/2009 | Kolze |
| 2009/0196344 | A1* | 8/2009 | Brown et al. ............ 375/240.02 |
| 2010/0091920 | A1* | 4/2010 | Alexander et al. ............ 375/350 |

FOREIGN PATENT DOCUMENTS

| EP | 1 968 268 A2 | 9/2008 |
| WO | 2009/078603 A1 | 6/2009 |

OTHER PUBLICATIONS

Raheli, R. et al. "Per-Survivor Processing: a General Approach to MLSE in Uncertain Environments", IEEE Trans. on Communications, vol. 43, No. 2/3/4, pp. 354-364 (1995).

(Continued)

*Primary Examiner* — Adolf DSouza (57) ABSTRACT

A first error-correcting decoder, adapted to decode the data bits of a received OFDM symbol; a re-encoder, to receive decoded bits and adapted to re-encode a leading portion of the decoded bits; a mapper, to receive the re-encoded leading portion of bits, map these bits to a corresponding subset of the plurality of sub-carriers, and thereby estimate a modulation symbol that was applied to each sub-carrier of said subset a channel estimator, to produce a channel estimate by comparing the sub-carrier modulation symbols with the corresponding sub-carriers actually received by the receiver; and an equalizer, to process the received signal to remove distortions introduced by the transmission channel, using the channel estimate, the re-encoder is adapted to begin re-encoding the leading portion of the bits before a trailing portion of the bits has been decoded by the decoder.

14 Claims, 4 Drawing Sheets (56) References Cited

OTHER PUBLICATIONS

Rahamim, Y. et al. "ML Iterative Tentative-Decision-Directed (ML-ITDD): a Carrier Synchronization System for Short Packet Turbo Coded Communication", Proc. of the 2004 11th IEEE Int'l. Conf. on Electronics, Circuits and Systems, pp. 346-349 (Dec. 2004).

Alexander, P. et al. "Outdoor Mobile Broadband Access with 802.11", IEEE Communications Magazine, vol. 45, No. 11, pp. 108-114 (Nov. 2007).

Extended European Search Report for European Patent Appln. No. 12165114.5 (Sep. 28, 2012).

* cited by examiner

REDUCED LATENCY CHANNEL-ESTIMATION

CROSS-REFERENCE TO RELATED APPLICATIONS

This application claims the priority under 35 U.S.C. §119 of European patent application no. 12165114.5, filed on Apr. 23, 2012, the contents of which are incorporated by reference herein.

The present invention relates to a receiver and method of receiving for an OFDM signal and—in particular—to channel estimation and equalization processes at a receiver. It is particularly relevant to wireless networking, based on the IEEE 802.11 family of standards.

BACKGROUND OF THE INVENTION

Wireless networking based on IEEE 802.11a/g is designed for stationary in-door use (in a Wireless Local Area Network or "WLAN", also known as a "Wi-Fi" network). Nevertheless, the standardizing body has decided to re-use the Physical Layer (PHY) from IEEE802.11a for Vehicular Ad-hoc Networks. The specification for this enhanced standard is defined in an amendment known as IEEE802.11p. The new standard is expected to find application in areas such as Intelligent Transportation Systems (ITS), both for safety and non-safety related purposes. The differences between IEEE 802.11a and IEEE 802.11p are primarily in the Medium Access Control (MAC) Layer.

The IEEE 802.11a physical layer specification uses Orthogonal Frequency Division Multiplexing (OFDM) to transmit data. Within the OFDM signal, the standard defines a preamble as well as 4 pilot sub-carriers in each OFDM symbol. The preamble occurs at the start of each packet (in the time domain). The pilot sub-carriers are present in every OFDM symbol at fixed locations in the spectrum (in the frequency domain). The preamble can be used for channel estimation at the start of a packet. During the packet, the pilot sub-carriers can be used for channel estimation. This may comprise updating the channel estimate generated from the preamble.

Notably, in the IEEE802.11p physical layer specification, no extra pilot sub-carriers were added. This makes it challenging to respond to the fast time-varying channel conditions that can be experienced under outdoor mobile conditions. The 4 pilots that are present in the transmitted signal may be too sparsely distributed in the signal spectrum to be able to track channel variations, in some circumstances.

Figure 1:
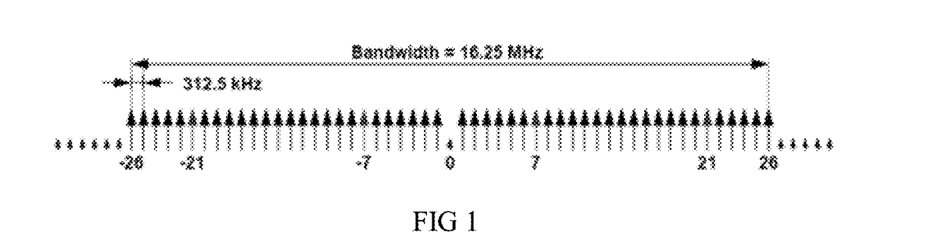

In FIG. 1, the distribution of pilot carriers and data carriers over the spectrum is shown for an IEEE802.11a signal. The overall bandwidth is 16.25 MHz. Each sub-carrier making up the OFDM signal is indicated as a large vertical arrow. The small vertical arrows indicate neighbouring frequency intervals, in which no sub-carriers are transmitted. The transmitted sub-carriers are labelled from −26 to +26. Carrier numbers −21, −7, 7, and 21 are pilot sub-carriers. The remaining carriers are data sub-carriers. The sub-carrier spacing is 312.5 KHz, as indicated.

For IEEE802.11p, the bandwidth and carrier spacing is half as large—that is, the bandwidth of one channel is 8.125 MHz (10 MHz channel spacing) and the carrier spacing within the channel is 156.25 kHz. Without appropriate measures, proper packet reception will fail under mobile conditions leading to high Packet Error Rate (PER). For safety related ITS applications, a high PER is unacceptable and therefore approaches for improving reception quality have been proposed. For example, P. Alexander et. al. ("Outdoor Mobile Broadband Access with 802.11", IEEE Communications Magazine, pp. 108-114, November 2007) have proposed a method for artificially making pilot sub-carriers that can be used for providing input to the channel estimation algorithms. The artificial pilots are made by re-encoding demodulated and decoded data. The philosophy behind this approach is that, after demodulation and Forward Error Correction (FEC) decoding, the decoded data has a low number of errors and therefore after re-encoding it can provide a reference for channel estimation. Whereas conventionally a pilot is a sub-carrier that is always modulated in a fixed/known way, the method of Alexander et al. uses data sub-carriers whose modulation is not known in advance. Instead the modulation is determined by decoding the data message—the decoded data is then assumed to be correct and on this basis the modulation of the corresponding sub-carriers is treated as "known".

According to the method disclosed by Alexander et al., each symbol is decoded twice, using two separate decoders. An early decoder is used in the process of obtaining the channel estimate. The resulting channel estimate is then used for interference cancellation, to allow a delayed version of the received signal to be decoded in the main decoder. The intention is that the delayed version of the signal that has been subject to interference cancellation based on the improved channel estimate will exhibit a higher signal-to-noise ratio and will therefore yield a lower error rate after decoding.

SUMMARY OF THE INVENTION

According to an aspect of the present invention, there is provided a receiver for an OFDM signal comprising a series of OFDM symbols, each symbol comprising a plurality of sub-carriers, each sub-carrier being modulated by one or more data bits encoded with an error-correcting code, the receiver comprising:

a first error-correcting decoder, adapted to decode sequentially the data bits of a received first OFDM symbol;

a re-encoder, arranged to receive decoded bits from the first decoder and adapted to re-encode a leading portion of the decoded bits;

a mapper, arranged to receive the re-encoded leading portion of bits from the re-encoder, map these bits to a corresponding subset of the plurality of sub-carriers, and thereby estimate a modulation symbol that was applied to each sub-carrier of said subset, by the transmitter;

a channel estimator, adapted to produce a channel estimate by comparing the sub-carrier modulation symbols estimated by the mapper with the corresponding sub-carriers actually received by the receiver; and an equalizer, adapted to process the received signal to remove distortions introduced by the transmission channel, using the channel estimate, wherein the re-encoder is adapted to begin re-encoding the leading portion of the bits before a trailing portion of the bits has been decoded by the decoder.

The present inventors have recognised that the additional step of demodulation and decoding proposed by Alexander et al. introduces latency, such that channel estimations based on this information are lagging behind the actual channel realizations. Alexander has avoided this problem by implementing two decoders and decoding each OFDM symbol twice. However, this has the further drawback that the complexity is twice as large compared to a conventional decoder, suitable for a stationary network. The present method provides a way to reduce the latency in the channel estimation. This can be used to avoid the doubling in complexity inherent in the approach proposed by Alexander et al. Alternatively or in addition, it may help to reduce the total delay through the receiver.

The latency is reduced by not waiting for the full output of the decoder. That is, the re-encoding begins before the decoding is complete. In particular, the inventors have recognised that a subset of the data sub-carriers corresponds to an early-decoded portion of the data bits (and vice versa). This subset of sub-carriers which can be calculated "early" is therefore ready for use in channel estimation earlier. The accuracy of the channel estimate may be reduced (compared with the approach of completely re-encoding the OFDM symbol) because the remainder of the sub-carriers are not yet known at the time the channel estimate is generated. However, in practice this trade-off between latency and accuracy has been found not to degrade the packet error rate significantly.

In other words, according to the present approach, a channel estimate can be derived from only a subset of the data sub-carriers, before the remaining data sub-carriers are available for use in channel estimation. (A sub-carrier is available for channel estimation when the corresponding bits have been decoded and re-encoded and mapped to the sub-carrier.)

In the present context, "sequential" decoding means that the decoder decodes some bits sooner than others. That is it is able to output its decision for some early bits before it can output its decision for other later bits in the message sequence. This may arise, for example, because the decoding of later bits in the data message is dependent in whole or in part upon earlier and later bits.

A sub-carrier symbol means the modulation to be applied to a given sub-carrier in order to transmit one or more bits on the sub-carrier. The sub-carriers may be modulated according to one of a number of constellations—including, but not limited to: Binary Phase-Shift Keying (BPSK) or Quadrature Amplitude Modulation (QAM).

Note that the data bits and the corresponding data sub-carriers are (initially) unknown to the receiver—in contrast to pilot sub-carriers whose modulation is known (that is, agreed in advance between the transmitter and receiver).

The channel estimator estimates the parameters of a model of the channel over which the signal is being transmitted. This model may comprise a time-domain model, a frequency-domain model, or a combination of both. Likewise, the estimation may be performed in the time-domain, the frequency-domain, or a combination of both.

The mapper is designed so that the leading portion of bits maps to the subset of the data sub-carriers and completely determines the modulation for those sub-carriers (without the need to know the values of any other bits, outside the leading portion). That is, the modulation symbols for the subset of sub-carriers are completely determined by the leading portion of bits alone.

Note that, where it is specified that one component of the receiver is arranged to receive the output of another, this may be achieved by direct connection between them, in some embodiments, or indirect connection, in other embodiments. That is, one or more additional components may act as an intermediary between the two specified elements. Exemplary intermediate components will become apparent in the following summary and detailed description.

Preferably, the leading portion of bits comprises the first third of the bits output by the decoder. This fraction has been found to be particularly beneficial in practice, since it allows a sufficiently large subset of the sub-carriers to be used for channel estimation, while keeping the latency low.

The receiver may comprise a second error-correcting decoder, adapted to decode the data bits of a received second OFDM symbol, wherein the received signal comprising said second OFDM symbol has been processed by the equalizer using said channel estimate.

Here, the channel estimate derived using (part of) the decoded first OFDM symbol is applied to improve the reception of a second OFDM symbol. In general, the first decoder and the second decoder may be the same or different decoders. Furthermore, the first and second OFDM symbols may be the same or different symbols.

The first decoder and second decoder are preferably the same decoder and the second OFDM symbol may be a subsequent symbol to the first OFDM symbol.

That is, the channel estimate derived based on the data sub-carriers of the first OFDM symbol is used to improve the reception and decoding of a second, later OFDM symbol. This approach avoids the additional complexity and/or delay that would be needed to re-process the first OFDM symbol, using a channel estimate that has firstly been derived from that same symbol.

Since the channel estimate that is applied to the second, subsequent symbol is derived from the first symbol, which was transmitted and received earlier in time, it is possible that the channel has changed between the symbols. This illustrates an advantage achieved by reducing the latency to obtain the channel estimate based on the first OFDM symbol: by reducing the latency, the channel estimate is ready earlier and can be applied to a second symbol as soon as possible (in the sequence of symbols) after the first symbol. Minimising the separation in time between the first and second symbols helps to ensure that the channel estimate derived from the first symbol is as accurate and up-to-date as possible for the second symbol.

Preferably, the first and second OFDM symbols are successively received symbols.

In this case, the first and second symbols are adjacent. The channel estimate derived from the first symbol is applied to assist the reception/decoding of the very next symbol. This helps to ensure that the channel has changed as little as possible in the intervening time (and therefore the channel estimate remains accurate).

The first OFDM symbol and the second OFDM symbol may be the same symbol and the second decoder may be adapted to decode said symbol for a second time.

That is, the channel estimate derived from the data sub-carriers of the first OFDM symbol is used to improve the reception and decoding of that same symbol. This may be achieved by re-processing the received signal comprising that symbol (at the equalizer) using the channel estimate, and then decoding the data bits of the same symbol for a second time. The principle is that the channel estimate is improved by studying the decoded data bits, because the error-correction in the decoder allows the data bits that were transmitted by the transmitter to be reconstructed more accurately; this reconstruction can be used to improve the channel estimate and thereby the equalisation; the received signal can be re-processed by the equaliser, to benefit from this improved channel estimate; and the data bits extracted from the re-processed signal can then be decoded a second time, in the hope that further errors can be corrected by the error-correcting code, thanks to the improved quality of the equalised signal.

In general, the decoders used for the first decoding and second decoding of the encoded data bits may be the same decoder or different decoders. Providing different decoders may add complexity to the receiver but may nonetheless be desirable in some applications.

Note that if the first and second decoders are implemented as separate decoders, the complexity may be similar to that of the receiver proposed by Alexander et al. However, the present receiver may have the advantage of reduced overall delay through the receiver: the final output will be generated with smaller delay, because the channel estimate needed to obtain it can be produced earlier in time.

The first decoder and the second decoder are preferably the same decoder.

In this example, a single decoder may be used to process each received symbol twice—once to derive the channel estimate and a second time to get the benefit of that derived channel estimate to increase the quality of reception.

The receiver may further comprise: a de-interleaver, adapted to de-interleave the data bits of the first received OFDM symbol and arranged to provide the de-interleaved bits to the decoder; and an interleaver, arranged between the re-encoder and the mapper and adapted to interleave the re-encoded leading portion of the bits provided by the re-encoder, before providing this portion to the mapper, wherein the interleaver is adapted to re-order the bits of a codeword such that adjacent bits of the codeword are distributed in non-adjacent sub-carriers, in the frequency domain.

Interleaving (at the transmitter) and de-interleaving (at the receiver) has the effect of spreading errors that arise in one part of the frequency spectrum across multiple codewords, increasing the chances that more of the codewords can be corrected by the error-correcting decoder. However, in the present context, the interleaver offers an additional advantage, because it spreads the leading portion of bits among non-adjacent sub-carriers. Since each sub-carrier in the subset of sub-carriers can be used as a synthetic "pilot" symbol, for channel estimation, the interleaver can thus ensure that the channel can be estimated at distributed points in the frequency domain.

The interleaver and the mapper are preferably designed such that the leading portion of bits completely determines the modulation for a subset of sub-carriers whose members are substantially uniformly spaced in the frequency domain.

The interleaver at the receiver, according to the present invention, is preferably similar in construction and operation to the interleaver at the transmitter. That is, it re-interleaves the bits in the same pattern that they were interleaved by the transmitter.

The channel estimator may be adapted to produce a sparse channel estimate comprising a set of values associated with a set of points in the frequency domain, the frequency and value of each point being derived from a respective member of the subset of sub-carriers, the channel estimator optionally being further adapted to produce a dense channel estimate by interpolating in the frequency domain between the points of the sparse estimate.

Here, the channel estimator firstly derives channel estimates corresponding to the sparsely distributed subset of sub-carriers (whose modulation has been determined from the leading portion of bits). The channel estimator then interpolates among these sparse estimates, to produce a channel estimate for all of the sub-carriers. This is based on an assumption of correlation, in the frequency domain, between the channel characteristics experienced by neighbouring sub-carriers. It allows a channel estimate to be provided for sub-carriers whose data bits have not yet been decoded by the error correction decoder. In this way, a complete (though approximate) channel estimate can be produced from only the leading portion of the bits output from the decoder.

The leading portion of bits decoded from the first OFDM symbol may be combined with a trailing portion of bits decoded from a preceding OFDM symbol; and the channel estimator may be adapted to produce a channel estimate based on the combined portions.

This can enable a more complete channel estimate to be prepared—an estimate is available for more of the sub-carriers, therefore less interpolation may be necessary. In some embodiments, interpolation could be eliminated completely; in other embodiments, there may be a combination of interpolation and prediction. Combining information from multiple OFDM symbols can also allow more effective use of the information available, without increasing latency: although the trailing portion of bits of any given symbol is not available as early as the leading portion of bits, it can nonetheless be used to enhance the channel estimate for use receiving a subsequent later symbol.

Preferably, the leading portion of bits decoded from the first OFDM symbol is combined with a trailing portion of bits decoded from the immediately preceding OFDM symbol. This maximises the "freshness" of the trailing portion of bits—they are used together with the leading portion of the bits from the very next OFDM symbol. As explained above, it is desirable to use the information as quickly as possible, to minimise the extent to which channel conditions have evolved. In general, the sequential decoder will ensure that the trailing portion of bits from previous OFDM symbols is decoded before the leading portion of bits of any subsequent OFDM symbol.

Preferably, the re-encoder is adapted to re-encode the trailing portion of bits decoded from said preceding OFDM symbol.

Preferably, the mapper is adapted to map the re-encoded trailing portion of bits from said preceding symbol to a second, different subset of the plurality of sub-carriers, and thereby estimate a modulation symbol that was applied to each member of the subset, at the transmitter.

Preferably, the channel estimator is adapted to produce a channel estimate for both subsets of sub-carriers, by comparing the sub-carrier modulation symbols estimated by the mapper with the corresponding sub-carriers in the signal received by the receiver.

Preferably, the combined portions together map to the full set of sub-carriers.

That is, a complete OFDM symbol can be formed when the combined portions of bits are mapped to their respective sub-carriers. This implicitly requires that the combined portions of bits correspond to the full set of bits for a symbol. In particular, if each OFDM symbol represents N bits and the leading decoded portion of the current symbol comprises the first m decoded bits, then the trailing decoded portion of the previous symbol should comprise the last N-m decoded bits.

This approach makes maximum use of the available information, with minimal latency.

Preferably, the leading portion of bits comprises the first third of the bits decoded for one symbol; and the trailing portion of bits comprises the latter two thirds of the bits of the previous symbol.

Taking the first third of the bits for the more recent symbol provides a beneficial compromise between minimising latency and maximising the number of sub-carriers which are available for channel estimation, as explained previously above.

The receiver may further comprise an interleaver, arranged between the re-encoder and the mapper and adapted to interleave the re-encoded bits provided by the re-encoder, before providing them to the mapper, the interleaver being adapted to re-order the bits of a codeword such that adjacent bits of the codeword are distributed in non-adjacent sub-carriers, in the frequency domain, wherein the interleaver is further adapted to receive the trailing portion of bits from the preceding OFDM symbol before receiving the leading portion of bits from the first OFDM symbol, and is adapted to reverse the order of the portions before re-ordering the bits.

This allows the trailing portion of the previous symbol and leading portion of the current symbol to be fed into a substantially standard interleaver, even though these portions do not belong to the same symbol. This can allow a simpler implementation of the channel estimation loop. Similarly, the mapper can be substantially standard. Both the interleaver and the mapper can treat the combined set of bits as if they were for one single OFDM symbol. The channel estimator can then compare each individual sub-carrier in this hybrid symbol with the correctly corresponding received signal—either a sub-carrier from the current symbol or a sub-carrier from the previous symbol, as appropriate.

Each OFDM symbol may further comprise one or more pilot sub-carriers, each pilot sub-carrier having been modulated with a known, predefined modulation symbol, and the channel estimator is preferably adapted to produce the channel estimate using both the subset of data sub-carriers and the one or more pilot sub-carriers.

The pilot sub-carriers used to produce each channel estimate may be derived from the same OFDM symbol as the data sub-carriers, or they may be derived from different OFDM symbols.

In this way, the artificial pilot sub-carriers (or "pseudo-pilots") provided by the present method can be combined with the existing true pilot sub-carriers for preparing the channel estimate.

The channel estimator may be adapted to produce the channel estimate by comparing the sub-carrier modulation symbols estimated by the mapper with the corresponding sub-carriers actually received by the receiver and by comparing the pilot sub-carriers actually received by the receiver with their corresponding predefined (known) modulation symbols.

One or both of the first and second decoders may be a Viterbi decoder.

The Viterbi decoder decodes bits sequentially, using a trellis. The decoded bits represent the most likely path through the trellis. The decoding of subsequent bits therefore depends upon the decoding of earlier bits. The initial bits of each codeword are available (for re-encoding) sooner than subsequent bits.

At least one and preferably all of: the first or second decoder; the re-encoder; the mapper; the de-interleaver; and the interleaver conform to a standard in the IEEE 802.11 family.

Preferably these components conform to one of IEEE 802.11a, g, or p. The present invention may be particularly advantageous when applied to one of the IEEE 802.11 physical layer (PHY) standards, because the encoding, interleaving, and mapping defined in this family of standards allow a leading portion of bits to be identified in the OFDM symbol which correspond to an evenly spaced subset of sub-carriers, in the frequency domain.

According to another aspect of the invention, there is provided a method for receiving an OFDM signal comprising a series of OFDM symbols, each symbol comprising a plurality of sub-carriers, each sub-carrier being modulated by one or more data bits encoded with an error-correcting code, the OFDM signal being received via a transmission channel, the method comprising:

decoding sequentially the data bits of a received first OFDM symbol, to produce decoded bits;

re-encoding a leading portion of the decoded bits, to produce re-encoded bits;

mapping the re-encoded leading portion of bits to a corresponding subset of the plurality of sub-carriers, and thereby estimating a modulation symbol that was applied to each sub-carrier of said subset by the transmitter;

generating a channel estimate by comparing the estimated sub-carrier modulation symbols with the corresponding sub-carriers actually received; and processing the received signal to remove distortions introduced by the transmission channel, using the channel estimate, wherein the step of re-encoding the leading portion of the bits begins before a trailing portion of the bits has been decoded.

That is, the re-encoding of the leading bits begins before the first OFDM symbol has been completely decoded. In particular, the step of re-encoding may begin as soon as possible after the leading portion of decoded bits is available.

Also provided is a computer program comprising computer program code means adapted to perform all the steps of the method above when said program is run on a computer, said computer program preferably embodied on a computer readable medium.

The computer program is preferably adapted to control a physical computing device to perform said steps, if the program is run on a computer.

BRIEF DESCRIPTION OF THE DRAWINGS

The invention will now be described by way of example with reference to the accompanying drawings, in which:

FIG. 1 is a schematic diagram showing the frequency spectrum of an OFDM signal according to IEEE 802.11a;

DETAILED DESCRIPTION OF THE EMBODIMENTS

The following description will concentrate on an embodiment based on the IEEE 802.11 physical layer. However, as those skilled in the art will appreciate, the invention is not limited in its scope to the IEEE 802.11 standard—it is equally applicable to other OFDM-based communication systems.

Figure 2:
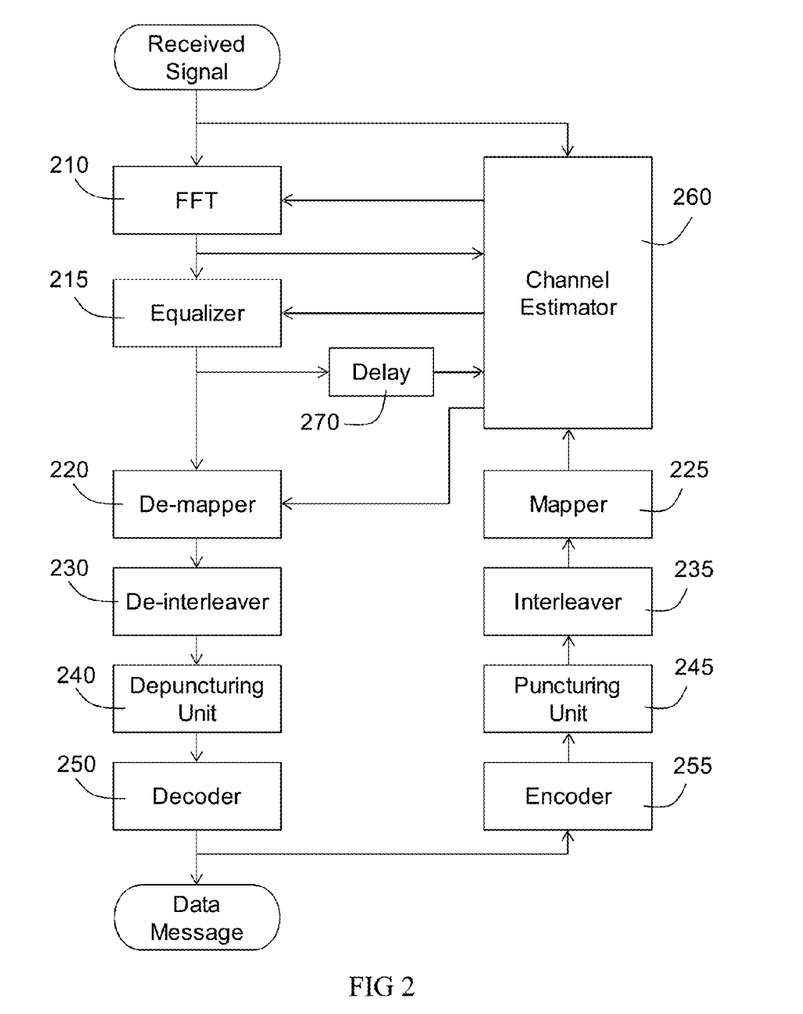
FIG. 2 is a block diagram of a receiver according to an embodiment of the invention.

A block diagram of a receiver according to an embodiment of the invention is shown in FIG. 2. The received signal is input to a Fast Fourier Transform unit 210. This converts the time-domain signal into the frequency domain. The output of the FFT 210 is coupled to the input of an equalizer 215. The equaliser 215 processes the signal (in the frequency domain) to remove distortion introduced by the transmission channel, based on an estimate of the channel. The output of the equalizer is coupled to the input of a de-mapper 220. The de-mapper converts the equalized signal into a stream of bits, by determining the modulation of each received sub-carrier and mapping this to a corresponding series of bits. In other words, the de-mapper determines the modulation symbol that was carried by each sub-carrier and outputs the bits corresponding to that symbol. Essentially, the de-mapper is responsible for demodulating the OFDM signal. The remaining blocks in the receive chain operate on the resulting bit-values (which may comprise soft-decision bits, incorporating a measure of reliability).

The output of the de-mapper 220 is coupled to the input of a de-interleaver 230. The de-interleaver 230 reverses the interleaving that was introduced at the transmitter. Interleaving is commonly performed at the transmitter in order to spread adjacent parts of a codeword among non-adjacent (or non-correlated) parts of the modulated signal. When interference occurs, parts of the signal that are close together (temporally or in the frequency domain) are likely to be affected similarly. The goal of interleaving is to re-order the bits so as to spread the effects of these correlated errors in a manner that can be corrected by the forward error correction channel code. The purpose of the de-interleaver 230 is to return the bits to the order needed for decoding.

The output of the de-interleaver 230 is coupled to the input of a depuncturing unit 240. Puncturing is used at the transmitter in order to decrease the redundancy of the error-correcting code. It involves discarding certain encoded bits in a specified pattern. The depuncturing unit 240 performs the inverse process—inserting padding bits according to the same pattern.

The output of the de-puncturing unit 240 is coupled to the input of a decoder 250. In this embodiment, the decoder is a Viterbi decoder, for decoding the convolutional code used at the transmitter. The output of the decoder 250 is passed to the output of the receiver, for use by an application.

The blocks 210-250 in the receive chain may be substantially similar to those a conventional IEEE 802.11 receiver. The design and function of such blocks will be familiar to the skilled person. For this reason, they will not be discussed in further detail here. The present embodiment differs primarily in the way that the channel estimate is generated.

According to the present embodiment, the output of the decoder 250 is also coupled to the input of an encoder (re-encoder) 255. This operates similarly to the convolutional encoder at the transmitter, to encode bits output by the decoder 250. The output of the (re-)encoder 255 is coupled to the input of a puncturing unit 245. The puncturing unit 245 performs a puncturing operation similar to that performed at the transmitter, deleting bits from the re-encoded codewords according to the same specified pattern. The output of the puncturing unit 245 is coupled to the input of an interleaver 235. This operates similarly to the interleaver at the transmitter, re-ordering the bits before they are mapped to sub-carriers. The output of the interleaver 235 is coupled to the input of a mapper 225. The mapper 225 functions similarly to the mapper at the transmitter—it is adapted to map the interleaved bits received from the interleaver 235 to modulation symbols to be applied to the sub-carriers. The output of the mapper 225 comprises a vector of complex numbers which specify the OFDM signal in the frequency-domain. Each number represents the modulation symbol applied to one of the sub-carriers.

The receiver also comprises a channel estimator block 260. This is responsible for producing the channel estimate used by the equalizer 215 to reduce distortion of the received signal. The channel estimate is prepared from several sources. The received signal forms one input to the channel estimator. The output of the mapper 225 is also coupled to an input of the channel estimator. The channel estimator treats the output of the mapper 225 as a set of pseudo-pilots or artificial pilot sub-carriers. The output of the FFT block 210 is coupled to another input of the channel estimator 260, in order to provide the frequency domain version of the received signal to the channel estimator. This comprises 48 data sub-carriers and 4 pilot sub-carriers. Finally, the equalized signal output by the equalizer 215 is provided to an input of the channel estimator via a delay block 270. This delayed signal comprises 48 data sub-carriers and 4 pilot sub-carriers, all of which have been equalized.

One output of the channel estimator 260 is coupled to an input of the equalizer 215, for providing the channel estimate to the equalizer, in the form of equalizer coefficients. Another output of the channel estimator 260 is coupled to the FFT block 210, so that the channel estimator can control the FFT window position.

Yet another output of the channel estimator 260 is coupled to the de-mapper. This connection is used to provide estimated sub-channel gain information from the channel estimator 260 to the de-mapper 220. This enables the de-mapper to provide reliability information for each de-mapped bit. The reliability information is used in the Viterbi decoder 250 in order to improve decoding results. The combination of reliability information and de-mapped bits output by the de-mapper is also known in the art as "soft-decision information" or "soft-bits".

The channel estimator 260 uses both time-domain channel estimation and frequency-domain channel estimation to derive a channel estimate. Channel estimation techniques will be known to those skilled in the art. The channel estimate is provided to the equalizer in the form of frequency-domain equalizer coefficients. In this embodiment, the channel estimator uses information from three sources: the preamble; the 4 pilot sub-carriers; and artificial pilot sub-carriers provided by the mapper 225. The first two sources are also used by conventional IEEE 802.11 receivers. The third source (artificial pilot sub-carriers) is a variation of the approach proposed by Alexander et al. For simplicity and conciseness, the following description will not repeat aspects of the design which are common either to the conventional 802.11 receiver or the receiver of Alexander et al.

The present inventors have recognised that if a doubling of the receiver complexity is to be avoided, it is desirable to reduce latency in the channel estimation loop as much as possible. The latency arises because the channel parameters are estimated (in part) by analysing the data messages that have passed through the transmission channel and the resulting channel estimates are used to equalise later received signals. Inherently, the transmission channel experienced by the later received signals may have changed from that which was experienced by the earlier signals (which were used to produce the channel estimate). This problem can be mitigated by reducing the latency as much as possible. The inventors have recognised that the latency is dominated by the decoding and re-encoding loop comprising the de-interleaver 230, Viterbi decoder 250, convolutional (re)-encoder 255, interleaver 235 and constellation mapper 225. The latency caused by the Viterbi decoder can be traded with decoding performance. The more latency allowed, the better the decoder performance.

Another aspect that contributes to latency in the approach of Alexander et al. is that interleaving is done separately for each OFDM symbol. This, in combination with the Viterbi decoder decoding latency, means that the latency introduced by the loop is at least two OFDM symbols—one because the interleaver has to save up data corresponding to one OFDM symbol before it can perform its task and the second because the Viterbi decoder has to be provided with data from a third OFDM symbol before it can output the data that completes the input for the interleaver.

According to the present embodiment, the latency is reduced by not waiting for the Viterbi decoder 250 to completely decode a symbol before beginning to re-encode the bits. Thus, a leading portion of bits decoded and output by the Viterbi decoder 250 is re-encoded by the encoder 255 as soon as that portion is available. As soon as it has been re-encoded, the leading portion of bits is passed to the puncturing unit 245 and interleaver 235, in turn. Then the interleaved bits output by the interleaver 235 are mapped, in the mapper 225, to a corresponding subset of the data sub-carriers in the OFDM symbol. Channel estimation proceeds using this subset of data sub-carriers, without waiting for the remainder of the data sub-carriers to become available. Since there is no need to wait for the remaining sub-carriers, the channel estimate is produced earlier in time—reducing latency. As soon as it is produced, the channel estimate can be used at the equalizer 215, for equalizing subsequently received signals.

The channel estimate is generated by comparing the subset of sub-carriers output by the mapper with the corresponding subset of sub-carriers as they were received. Each sub-carrier modulation symbol produced by the mapper is treated as a known value (just like the known modulation of a conventional pilot sub-carrier). This provides the reference data for the channel estimation.

Figure 3:
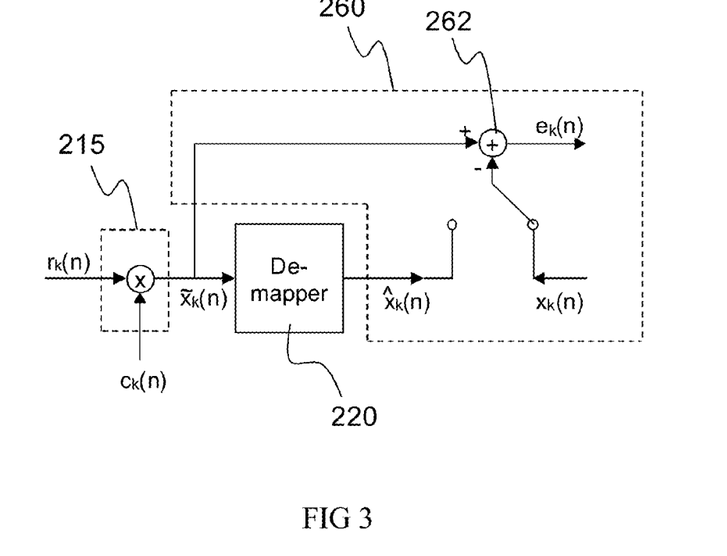
FIG. 3 illustrates a channel estimation algorithm for the receiver of FIG. 2 in greater detail.

The channel estimation algorithm for the present embodiment is illustrated in greater detail in FIG. 3. In this diagram, $r_k(n)$ is the output of the FFT 210 for sub-channel k; $c_k(n)$ is an equalizer coefficient for sub-channel k (representing the channel estimate of this sub-channel); and $\tilde{x}_k(n)$ is the equalized output of sub-channel k. An example update rule (MMSE) for the equalizer coefficient is as follows:

$$c_k(n+1) = c_k(n) - \mu e_k(n) r^*_k(n)$$

In addition to the previous equalizer coefficient, this formula uses an error signal $e_k(n)$ and the output of the FFT (complex conjugated). The error signal is derived by comparing the equalized output with either the hard-decision output, $\hat{x}_k(n)$, of the demapper (when no pilot is available) or the (pseudo-) pilot symbol $x_k(n)$. The comparison is performed by subtraction unit 262. In the case where the carrier k is a pseudo-pilot symbol, the system should account for the re-encoding latency when determining the error signal. In that case, the equalized output should be delayed such that the comparison is done consistently. This is the purpose of the delay block 270 in FIG. 2 (not shown in FIG. 3.

In other embodiments, the output of the de-mapper—that is, the hard decision output $\hat{x}_k(n)$—can also be used in the channel estimation procedure. (Note that this link from the output of the de-mapper 220 to the channel estimator 260 is not shown in FIG. 2).

Such methods for channel estimation by comparing a received sub-carrier with a reference sub-carrier are known in the art and will not be described in further detail here.

The channel estimate produced by the channel estimator 260 based on the subset of data sub-carriers is necessarily sparse—that is, channel coefficients are not available for all sub-carriers. There are various strategies for dealing with this sparseness, two of which will be described in detail below. Firstly, the selection of the leading portion of bits will be considered in more detail.

Figure 4:
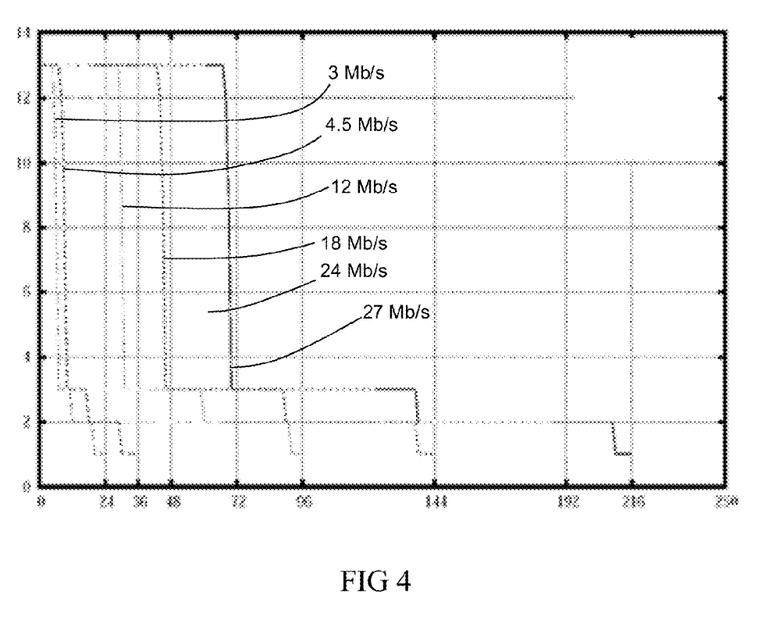
FIG. 4 is a plot showing the spacing between artificial pilot sub-carriers as a function of the number of bits decoded from each OFDM symbol.

FIG. 4 illustrates the inter-(pseudo)-pilot distance as function of the number of encoded and interleaved information bits. The number of bits that is needed to provide the complete set of data sub-carriers as pseudo-pilots depends on the data-rate mode that is used for communication. When the complete set of data sub-carriers is available for channel estimation (as in Alexander et al.) the distance between neighbouring artificial (pseudo) pilots is 1. Thus, each plot shown in FIG. 4 ends with a distance value of 1. This is achieved when the complete OFDM symbol is used. In IEEE 802.11p, 8 data-rate modes are defined ranging from 3 Mb/s up to 27 Mb/s. Six of these are shown in FIG. 4: 3, 4.5, 12, 18, 24, and 27 Mb/s. For the 3 Mb/s mode, 24 data bits have to be encoded and interleaved in order to generate all pseudo-pilots (R=½ convolutional encoding, BPSK modulation, 48 data subcarriers). Meanwhile, at the highest data-rate (27 Mb/s), 216 data bits are needed (R=¾, 64-QAM).

When no information bits are re-encoded, only the 4 real pilot sub-carriers are available. As can be seen from FIG. 1, 13 data sub-carriers are present between successive pilot-carriers and therefore the curves in FIG. 4 start for 0 encoded information bits at a distance of 13. Starting from 0, as more and more information bits are (sequentially) encoded and interleaved, more pseudo-pilots can be regenerated and the maximum pilot distance becomes smaller. The distance reduces in steps because multiple bits are required to be interleaved in order to completely specify the modulation of each additional subset of sub-carriers. Not every bit re-encoded will result in an additional sub-carrier becoming available for channel estimation.

With the interleaving scheme and constellation mapping defined by IEEE 802.11, the first third of the information bits is sufficient to realise a maximum pilot distance of only 3. This means that when the Viterbi decoder has released the first ⅓ part of the information bits of an OFDM symbol, the receiver can already re-encode and regenerate pseudo pilots in an evenly distributed pattern. As mentioned above, with all information bits encoded 48 data sub-carriers (pseudo-pilot sub-carriers) will be produced. Therefore, with ⅓ of the information bits, 16 data sub-carriers can be regenerated. Stated differently, with a short latency, a nicely distributed group of pseudo pilot sub-carriers can be produced.

Using interpolation in the frequency domain, the channel can also be estimated for the remaining data sub-carriers that are positioned between these pseudo-pilot sub-carriers. Alternatively or in addition, the channel estimation can be improved for these remaining data sub-carriers by using extrapolation (prediction) in the time domain, based on pseudo-pilot carriers from earlier OFDM symbols that can be generated with somewhat larger latency.

Three different approaches for pseudo-pilot sub-carrier generation will now be described, with reference to FIGS. 4 and 5. The first method (a) is a comparative example, based on the approach taken by Alexander et al. The two other methods (b) and (c) represent different embodiments of the present invention.

Figure 5:
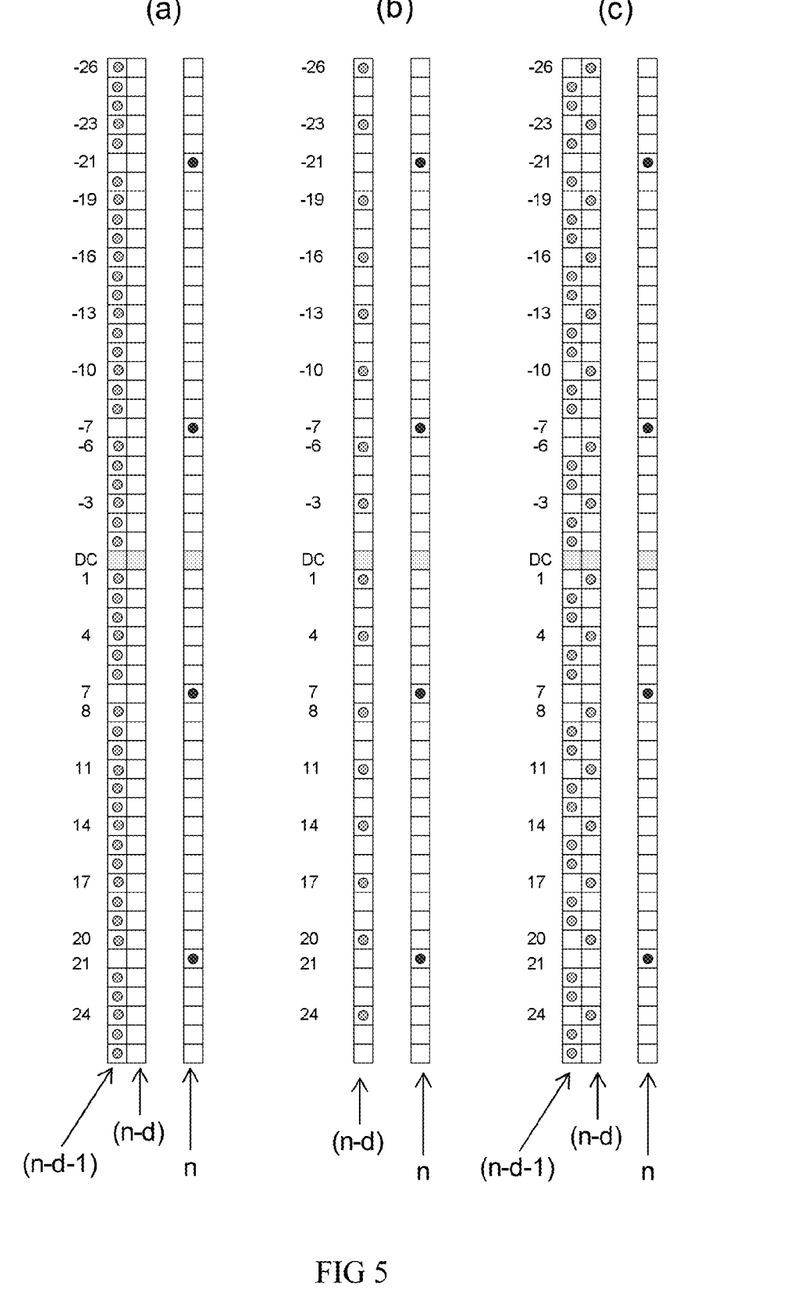
FIG. 5 illustrates three different ways of obtaining artificial pilot sub-carriers, in the frequency domain.
Figure 6:
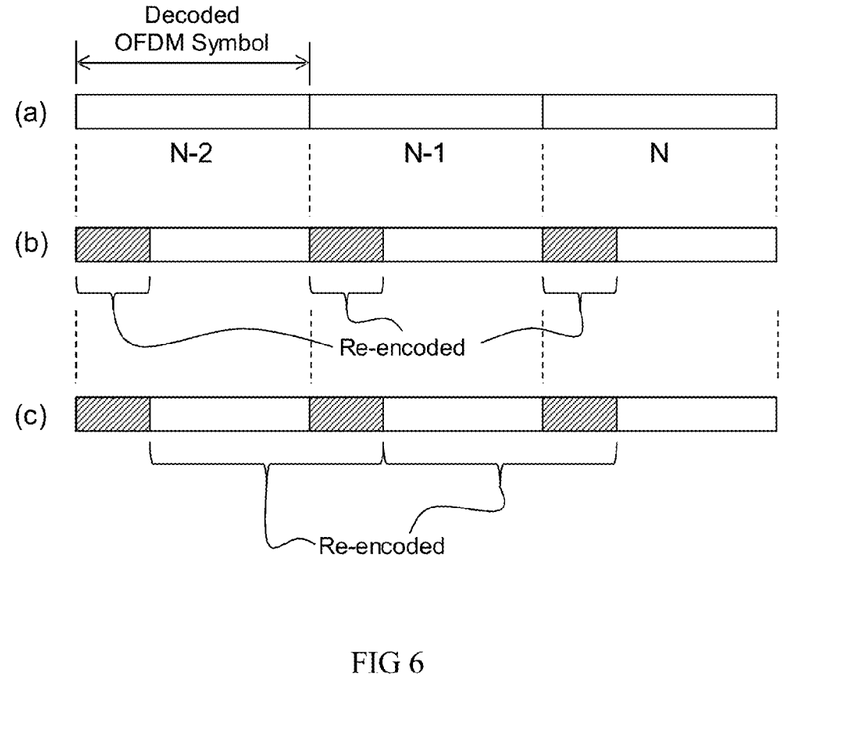
FIG. 6 illustrates the same three different ways in the time domain.

In FIG. 5, the sub-carriers of each OFDM symbol are shown in the frequency domain, with frequency arranged along the vertical (y-axis) and time (symbol-index) along the horizontal (x-axis). The filled circles indicate which pilot sub-carrier is obtained from which OFDM symbol. FIG. 6 illustrates the same thing in the time domain. Again, successive OFDM symbols are arranged along the horizontal (x-axis). The bits of each symbol are denoted by a rectangular box. The hatched portion of the box denotes bits which have been encoded and re-encoded for use in channel estimation.

In FIG. 5(a), the channel estimate at OFDM symbol n is based on information derived from two sources. Firstly, the four (true) pilot sub-carriers in symbol n are available for channel estimation. Secondly, the complete set of data sub-carriers from an earlier-received frame n−d−1 is available.

This mirrors the approach of Alexander et al.—only completely decoded and re-encoded symbols are used in the channel estimation. Accordingly, in FIG. 6(a), the complete set of bits of each OFDM symbol is shown as decoded and re-encoded (indicated by the hatching).

The actual latency (d+1) of method (a) depends on the implementation. It is typically of the order of 2 or 3 OFDM symbols—which, in the case of 802.11p, corresponds to 16 or 24 μs, respectively.

FIG. 5(b) illustrates a first embodiment of the present invention. The four real pilot sub-carriers of symbol n are still used for channel estimation. These are combined with a subset of the sub-carriers (comprising 16 of the 48 sub-carriers) from symbol n-d. This subset of 16 sub-carriers is obtained by decoding and re-encoding the first third of the data bits of the OFDM symbol. This is indicated by the hatched portion of each symbol in FIG. 6(b). Because the 16 sub-carriers are obtained from the first third of the symbol, they are ready earlier for use in channel estimation. In this example, the 16 pseudo-pilot sub-carriers come from symbol n-d. Comparing FIG. 5(a) with 4(b), the latency of the pseudo-pilots has been reduced by 1 symbol.

With the method of FIG. 5(b), channel estimates for the remaining 32 data sub-carriers can be generated by interpolation in the frequency domain. This may be suitable for a channel with a high time selectivity and low frequency selectivity. For such a channel, it may be preferred to sacrifice frequency resolution in order to achieve minimal latency.

A second embodiment is illustrated in FIG. 5(c). In this embodiment, the 16 pseudo-pilots from symbol n-d are used, exactly as in the method (b). Likewise, the 4 real pilot symbols of symbol n are used, as in the methods (a) and (b). However, instead of using frequency domain interpolation to obtain the remaining 32 pseudo-pilot sub-carriers—as in method (b)—these sub-carriers are obtained from the preceding symbol n−d−1. Thus, the channel estimate for the remaining 32 sub-carriers is one symbol older than the channel estimate for the 16 "early available" sub-carriers. Consequently, a full set of pseudo-pilot sub-carriers is available, but they are not derived from a single symbol—in contrast to method (a). FIG. 6(c) illustrates the pattern of re-encoding for each symbol. The hatched portion of each symbol represents the first third—that is, the early-decoded bits corresponding to 16 sub-carriers. This is grouped together with the trailing two-thirds of bits from the preceding symbol and re-encoded, for use in channel estimation.

With method (c), the channel estimate has higher resolution in the frequency domain, but because it is generated with greater latency (at least in the case of the 32 "late" sub-carriers, it may be less suitable for a fast-changing channel. That is, method (c) may be preferred for use in circumstances where the transmission channel has high frequency selectivity and low time selectivity.

Note that method (c) can use essentially the standard interleaver defined for IEEE 802.11—the same interleaver as is used in method (a) to interleave the full set of bits for each symbol. However, the hatched and clear portions of bits in FIG. 6(c) should be swapped. This can be implemented at the interleaver 235 without any increase in complexity.

The methods (b) and (c) are not necessarily mutually exclusive alternatives. The reference information for the remaining sub-carriers (not included in the "early" subset of 16) could be created by a combination of interpolation in the frequency domain, as in method (b), and extrapolation in the time domain, as in method (c).

The present invention is based upon the recognition that, for satisfactory channel estimation, not all pseudo-pilots need to be regenerated with short latency. If a set of pseudo-pilots can be generated quickly, preferably evenly distributed over the signal spectrum, and the remaining pseudo-pilots can be generated with somewhat more latency, a channel estimation can be accomplished using extrapolation in time, interpolation in frequency, or both. The accuracy of the channel estimation that can be obtained depends on the frequency selectivity and the time selectivity. For a channel with high frequency selectivity the (pseudo-) pilots should be spaced with small distance in the frequency domain and for a channel with high time selectivity (pseudo-)pilots should be generated with short latency.

While the invention has been illustrated and described in detail in the drawings and foregoing description, such illustration and description are to be considered illustrative or exemplary and not restrictive; the invention is not limited to the disclosed embodiments.

For example, in the embodiments described above, each channel estimate is applied in the equaliser as soon as possible to later symbols. The number of symbols of delay is determined by the latency in the decoding; re-encoding; and channel estimation loop. However, it is also possible to operate the invention in an embodiment in which each symbol is re-processed using a channel estimate that has been derived for that same symbol. This approach has already been demonstrated by Alexander et al. (decoding each symbol in full before generating a channel estimate from it). The complexity of the receiver is likely to increase when using this approach—the received signal must be stored in a memory in some form, in order for it to be re-processed. However, the approach of the present invention of quickly re-encoding only a leading portion of the symbol could allow the complexity to be mitigated. For example, by reducing the latency of the loop (compared with the receiver of Alexander et al.) the present invention may enable the memory capacity to be reduced, since it will not be necessary to store data for as long. A related advantage is that the total delay through the receiver may be reduced.

In general, the idea of re-processing the same symbol with its own channel estimate can be iterated. Each successive iteration of decoding can correct more errors, leading to a better channel estimate and—in turn—improved signal fidelity at the output of the equaliser. This better signal can allow further improved decoding, in the next iteration. These iterations may terminate when no further improvement in decoding can be obtained—for example, when the decoded output from two successive iterations is identical.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope. To say that a first component receives (for example) data or a signal from a second component does not necessarily mean that the two components are directly connected, or that the data or signal is delivered unchanged from one to other. Rather, in includes the possibility that other components are connected in the path between the first and second components and the data or signal undergoes some processing during its journey. That is the expression "receiving from" and similar language does not exclude intermediaries.

The invention claimed is:

1. A receiver for an OFDM signal including a series of OFDM symbols, each symbol having a plurality of sub-carriers, each sub-carrier being modulated by at least one data bit encoded with an error-correcting code, the receiver comprising:
   a first error-correcting decoder, adapted to decode sequentially the data bits of a received first OFDM symbol;
   a re-encoder, arranged to receive decoded bits from the first decoder and adapted to re-encode a leading portion of the decoded bits;
   a mapper, arranged to receive the re-encoded leading portion of bits from the re-encoder, map these bits to a corresponding subset of the plurality of sub-carriers, and thereby estimate a modulation symbol that was applied to each sub-carrier of said subset, by the transmitter;
   a channel estimator, adapted to produce a channel estimate by comparing the sub-carrier modulation symbols estimated by the mapper with the corresponding sub-carriers actually received by the receiver; and
   an equalizer, adapted to process the received signal to remove distortions introduced by the transmission channel, using the channel estimate,
   wherein the re-encoder is adapted to begin re-encoding the leading portion of the bits before a trailing portion of the bits has been decoded by the decoder; and
wherein
   the leading portion of bits decoded from the first OFDM symbol is combined with a trailing portion of bits decoded from a preceding OFDM symbol; and
   the channel estimator is adapted to produce a channel estimate based on the combined portions.

2. The receiver of claim 1, further comprising a second error-correcting decoder, adapted to decode the data bits of a received second OFDM symbol,
   wherein the received signal comprising said second OFDM symbol has been processed by the equalizer using said channel estimate.

3. The receiver of claim 2, wherein the first decoder and the second decoder are the same decoder and the second OFDM symbol is a subsequent symbol to the first OFDM symbol.

4. The receiver of claim 2, wherein the first OFDM symbol and the second OFDM symbol are the same symbol and the second decoder is adapted to decode said symbol for a second time.

5. The receiver of claim 4, wherein the first decoder and the second decoder are the same decoder.

6. The receiver of claim 1, further comprising:
   a de-interleaver, adapted to de-interleave the data bits of the first received OFDM symbol and arranged to provide the de-interleaved bits to the decoder; and
   an interleaver, arranged between the re-encoder and the mapper and adapted to interleave the re-encoded leading portion of the bits provided by the re-encoder, before providing this portion to the mapper,
   wherein the interleaver is adapted to re-order the bits of a codeword such that adjacent bits of the codeword are distributed in non-adjacent sub-carriers, in the frequency domain.

7. The receiver of claim 6, wherein the channel estimator is adapted to produce a sparse channel estimate comprising a set of values associated with a set of points in the frequency domain, the frequency and value of each point being derived from a respective member of the subset of sub-carriers,
   the channel estimator being further adapted to produce a dense channel estimate by interpolating in the frequency domain between the points of the sparse estimate.

8. The receiver of claim 1, wherein the combined portions together map to the full set of sub-carriers.

9. The receiver of claim 8, further comprising:
   an interleaver, arranged between the re-encoder and the mapper and adapted to interleave the re-encoded bits provided by the re-encoder, before providing them to the mapper,
   the interleaver being adapted to re-order the bits of a codeword such that adjacent bits of the codeword are distributed in non-adjacent sub-carriers, in the frequency domain,
   wherein the interleaver is further adapted to receive the trailing portion of bits from the preceding OFDM symbol before receiving the leading portion of bits from the first OFDM symbol, and is adapted to reverse the order of the portions before re-ordering the bits.

10. The receiver of claim 1, wherein each OFDM symbol further comprises at least one pilot sub-carrier, each said pilot sub-carrier having been modulated with a known, predefined modulation symbol, and
   wherein the channel estimator is adapted to produce the channel estimate using both the subset of data sub-carriers and the at least one pilot sub-carrier.

11. The receiver of claim 1, wherein one or both of the first and second decoders is a Viterbi decoder.

12. The receiver of claim 1, wherein at least one of:
   the first and the second decoders;
   the re-encoder;
   the mapper;
   the de-interleaver; and
   the interleaver
conform to a standard in the IEEE 802.11 family.

13. A method for receiving an OFDM signal having a series of OFDM symbols, each symbol having a plurality of sub-carriers, each sub-carrier being modulated by at least one data bit encoded with an error-correcting code, the OFDM signal being received via a transmission channel, the method comprising:
   decoding sequentially the data bits of a received first OFDM symbol, to produce decoded bits;
   re-encoding a leading portion of the decoded bits, to produce re-encoded bits;
   mapping the re-encoded leading portion of bits to a corresponding subset of the plurality of sub-carriers, and thereby estimating a modulation symbol that was applied to each sub-carrier of said subset by the transmitter;
   generating a channel estimate, using a channel estimator, by comparing the estimated sub-carrier modulation symbols with the corresponding sub-carriers actually received; and
   processing the received signal to remove distortions introduced by the transmission channel, using the channel estimate,
   wherein the step of re-encoding the leading portion of the bits begins before a trailing portion of the bits has been decoded; and
wherein
   the leading portion of bits decoded from the first OFDM symbol is combined with the trailing portion of bits decoded from a preceding OFDM symbol; and the channel estimator is adapted to produce a channel estimate based on the combined portions.

14. A non-transitory computer-readable storage medium comprising a computer program code that performs all the steps of claim 13 when said program is run on a computer.

* * * * *